Patented Dec. 23, 1952

2,622,987

UNITED STATES PATENT OFFICE 2,622,987

COATING COMPOSITION AND THE VEHICLE THEREFOR CONTAINING A COMPOUND OF A CLAY AND AN ONIUM BASE

George L. Ratcliffe, Los Angeles, Calif., assignor to National Lead Company, Los Angeles, Calif., a corporation of New Jersey No Drawing. Application April 10, 1951, Serial No. 220,331

19 Claims. (Cl. 106—20)

This invention relates to surface coatings and process of making the same. A surface coating is a coating of the class comprising paints for the protection of wood and metal, and lacquers, and printing inks. This application involves subject matter common with my abandoned application Serial No. 640,381, filed January 10, 1946 and is a continuation in part of that application.

A paint generally comprises a pigment base, such as white lead incorporated in a vehicle such as linseed oil, to which may be added a drier or a thinner. Where such a paint is supplied as a ready-mixed paint, the pigment base is liable to settle, which is not desirable. A number of thickening or suspending agents have been proposed and incorporated with the vehicle or with the pigment base and the vehicle, but these generally have not been satisfactory. A printing ink generally comprises an ink base such as carbon black incorporated in a vehicle such as a bodied linseed oil, or a synthetic resin, or a varnish, to which may be added driers and thinners, and which is also liable to settling.

In many surface coatings, it is desirable to exercise a control of the viscosity or thickening of the coating during the application. In the case of paint, this viscosity control should be such that the paint, following application, should not run or sag but should remain in place, as applied by brushing, spraying or dipping. In the case of printing inks, where high speed presses are used and where elevated temperatures are used and where elevated temperatures are encountered on the press and in the subsequent drying, it is desirable that the ink maintain its viscosity at the elevated temperatures, so that it will not run or bleed prior to drying. Thus another objective is to provide a material for viscosity control.

One of the objects of this invention, therefore, is to provide a vehicle for a pigment base or for an ink base, containing a medium capable of imparting to the vehicle viscosity or thickening properties.

Another object of this invention is to provide a surface coating comprising a pigment base or an ink base suspended in an organic vehicle, together with a suspending agent or medium, which will serve to effectively maintain the base in suspension.

Another object is to provide a process of making such a vehicle and such a surface coating.

Generally stated and in accordance with illustrative embodiments of this invention, an organic vehicle has incorporated therewith a medium or agent embodying a modified clay which forms a gel in the vehicle and has a substantial gel characteristic therein. A clay which is particularly useful for modification and for such incorporation is bentonite, including sodium and magnesium bentonites, which have particularly high base-exchange properties, traceable to their high percentage content of montmorillonite. Other clays may, however, be modified as hereinafter described for such employment.

The clays which are useful as starting materials in accordance with this invention are those exhibiting base-exchange properties, particularly those exhibiting comparatively high base-exchange properties and containing cations capable of more or less easy replacement. The term "clay," as used in the specification and the claims, includes montmorillonite, viz., sodium, potassium, lithium, and other bentonites, magnesium bentonite, sometimes called hectorite and saponite. Other clays found in nature are nontronite, attapulgite, illite, zeolites, fuller's earth, particularly those of the Georgia-Florida type, halloysite, kaolinite, nacrite, and dickite. Clays, particularly those having high base-exchange capacities, as a result of certain structural atomic replacements, are believed to have negative charges which are normally neutralized by inorganic cations. As found in nature, therefore, they exist as salts of the weak clay-acids with bases such as the alkali- or alkaline-earth metal hydroxides.

The base-exchange capacities of the various clays enumerated run from a low of about 3 to a high of about 100, based upon milliequivalents of exchangeable base per 100 grams of clay. Montmorillonite has comparatively high base-exchange capacities, viz., 60–100; kaolinite and halloysite have comparatively low base-exchange capacities, viz., 3–15 and 6–15, respectively; attapulgite and illite have higher base-exchange capacities, viz., 25–35 and 15–40, respectively. The clays of higher base-exchange capacities are particularly useful where high exchange of an organic base for the cation of the clay is desired.

Generally stated and in accordance with illustrative embodiments of this invention, a clay, particularly one exhibiting substantial base-exchange capacity, is reacted with an organic compound, more particularly one hereinafter generally defined and referred to as an "onium" compound, by substitution of the clay cation with the cation of the organic compound, which cation is of a class hereinafter referred to as an "onium" base. The resulting compound may be used in carrying out this invention, or may be further reacted with another organic compound, resulting in attachment of an organic radical to what is hereinafter generally referred to as the "onium" radical, in place of a hydrogen in the base. This invention is not, however, restricted to the use of a reaction product of a base-salt with a clay-salt, but includes the reaction product of a free base with an acid-clay.

An "onium" compound has been defined in Hackh's Chemical Dictionary, Second Edition, as:

"A group of organic compounds of the type RXH$_y$ which are isologs of ammonium and contain the element X in its highest positive valency, viz:

"Where X is pentavalent as in ammonium, phosphonium, arsonium and stibonium; where X is tetravalent as in oxonium, sulfonium, selenonium and stannonium compounds; and where X is trivalent, as in iodonium compounds; and that they may be considered addition compounds of oxonium, carbonium, stibonium, c. f., -inium, -ylium."

A number of the compounds capable of reacting with clays, particularly bentonite, will be described; it is to be understood, however, that various other compounds reactable with clays, and particularly bentonite or hectorite, may be employed. These may include salts of aliphatic, cyclic, aromatic, and heterocyclic amines, primary, secondary, and tertiary amines and polyamines, also quaternary ammonium compounds, as well as other monovalent or polyvalent onium compounds, such as triphenylalkyl phosphonium-arsonium-stibonium-halides, dialkyl-, or arylsulphonium and selenonium halides and pyrones, such as 2,5-dimethyl gamma pyrone hydrochloride.

Untreated sodium bentonite in contact with water absorbs large quantities of the water and swells, forming a gel. This swelling has been attributed to the lamellar structure of the clay mineral and to adsorption of water molecules onto surfaces of the mineral sheets, thus giving rise to a separation of the sheets as the oriented water layers build up to an appreciable depth. If the surfaces of the clay laminae contain organic matter, as by the process of base-exchange with an organic base, the ability of water molecules to be adsorbed is eliminated, and the clay no longer exhibits its former swelling capacity in water. Thus Wyoming bentonite, for example, which is essentially the sodium salt of montmorillonitic acid, is capable of reacting with organic bases or their salts, e. g.:

1. 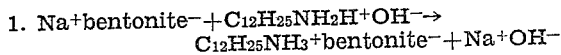

or more readily

2. 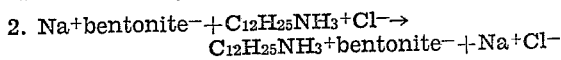

The resulting dodecylammonium bentonite is visualized as consisting of clay mineral laminae with dodecylammonium groups fairly regularly distributed over the surfaces and attached by means of the substituted ammonium groups, with the hydrocarbon tails extending out over the crystal surfaces. Such a material is now organophilic rather than hydrophilic and as such exhibits in organic liquids some of the characteristics which the untreated clay exhibited in water; for example, it will swell in many organic liquids and will form stable gels and colloidal dispersions. Such gels are visually homogeneous and often transparent or translucent. They are thermally stable up to the boiling point of the liquid phase and show little tendency to flow or run when heated. The more dilute systems which are more or less liquid have viscosity much higher than those of the liquids themselves, and in most cases exhibit thixotropy characteristic of the analogous bentonite-water system.

The modified clay is one which forms a gel in a surface coating vehicle and can therefore be readily incorporated with a vehicle and the pigment or ink base. This can be accomplished by adding the modified clay to the vehicle, which then forms a gel therein. The pigment or ink base can thereafter be added. However, the modified clay can be added to a paint or ink including the pigment or ink base and a vehicle. In each case it will perform its desired function of controlling the viscosity or thickening of the vehicle and of keeping the pigment or ink base in suspension. The percentage of modified clay which should be used depends upon the character of the surface coating and of the vehicle and the percentage of the pigment or ink base and surface coating; generally, however, the amount can be from 1 to 25 pounds per 100 gallons of the finished surface coating.

The situation is analogous to the above if the element X of the onium compound is other than nitrogen. The onium compound, should, however, be such that, for example, a resultant onium-bentonite will have substantial swelling properties in organic liquids. Such swelling characteristic may be determined by introducing 2 grams of the onium-bentonite product in 100 milliliters of nitrobenzene and noting the amount of swelling in milliliters. Thus in the case of amine-bentonite products, the employment of salts of aliphatic amines, including the octylamine, will not produce an amine-bentonite product showing a swelling of over 7.2 ml.; however, the dodecylamine bentonite product will show a swelling of from 27 ml. to 65 ml. There is generally a distinct region of increase of swelling with amine-bentonites in which the amine has in excess of 10 carbon atoms in the carbon chain, such swelling being generally in excess of 25 ml. These products may well be called "high-swelling" onium-bentonites.

The ratio of the onium compound, such as, for example, an amine compound to bentonite, may be varied within certain limits in converting the bentonite to the organophilic condition. In general, it is satisfactory to react the amine salt with the bentonite in the ratio of 100 milliequivalents of amine salt to 100 grams of bentonite, which is approximately the base-exchange capacity of the standard highly swelling bentonites. Typical values of swelling on the above basis are listed below for a series of dodecylammonium-bentonites, in which the ratio of amine to bentonite was varied over wide limits:

| Amine/bentonite | 50 me./100 g. | 75 | 100 | 125 | 150 | 200 | 300 |
|---|---|---|---|---|---|---|---|
| Swelling in nitrobenzene, ml | 27.3 | 43.0 | 65.3 | 47.5 | 30.0 | 20.5 | 15.5 |

This table indicates the wide range over which the amine-bentonite ratio can be varied, but it also shows the optimum effect exhibited at the theoretical base-exchange value for this combination.

For the most efficient use of organic base to obtain optimum gelling properties, it is therefore desirable either to select an onium compound, such as an amine compound, which, when converted to the onium base form and reacted by base-exchange with the clay, will completely cover the surface of the mineral, or to substitute the proper aliphatic chain in a polyammonium base. It has been found that a base whose hydrophilic radical has a linear dimension of at least 14 angstrom units or molecular area of at least 70 square angstrom units is suitable. For example, a primary amine with a chain of 10 carbon atoms, e. g., decyl amine, will substantially fulfill the requirements of covering the clay surface. An excess of organic matter as occasioned by use of an amine of area greater than 14 linear or 70 square angstrom units, as for example octadecylamine, is not detrimental to the gelling properties of the amine-bentonite composition. Good results, for instance, have been obtained with primary amines having hydrocarbon chains of twelve or more carbon atoms.

The type of clay material to be used may vary with the intended use. For optimum gelling properties, it is best to use a bentonite which exhibits good gelling properties in water. However, some non-swelling clays when converted to the onium salt form will swell in organic liquids and give rise to thixotropic colloidal dispersions.

It is to be understood that when reference is made to basic organic onium compounds such as amines, it is implied that before reacting with the clay by base-exchange, the amine is converted to the onium form either by the addition of acid or by reason of the fact that some part of the inorganic base in the naturally occurring clay consists of hydrogen.

In the preparation of organic gels, various methods may be followed. If it is desired to prepare a gel free from abrasive impurities, it may be advantageous to start with a dilute aqueous dispersion of bentonite and allow the non-bentonite impurities to settle out, thereafter reacting with the purified bentonite a salt of the desired amine or other basic organic compound. The flocculated onium bentonite is then filtered out, dried, ground and mixed with the organic liquid which is to be bodied up. For rapidly accomplishing dispersion of the onium bentonite in the organic liquid, it is often advantageous to heat the mixture and pass it through a multiple-roll mill such as a paint mill, although this is not necessary for some combinations.

Where impurities associated with the clay are of no consequence, it is often sufficient merely to add the dry clay to the organic liquid containing sufficient amine salt or other salts of basic organic compound to more or less completely react with the clay. The gelling effect is thus enhanced by converting the amine to the salt form, or any of the other basic organic compounds to the onium form, either before or after the addition of the clay, by introduction of an acid such as hydrochloric or acetic acid. Further, it is also feasible to prepare a dry mixture, to be used in gel formation, by mixing the amine with dry clay and then mixing in the requisite amount of an acid, such as acetic, or by mixing the amine salt with the dry clay, thereafter adding the dry amine-bentonite mixture to the liquid with which it is desired to produce a gel.

The vehicles which may be employed are the following: (1) Oxygen convertible vehicles: A. Drying oils, raw or heat processed; soybean oil, linseed oil, dehydrated castor oil, oiticica oil, China-wood or tung oil; B. Drying oil modified varnishes: oleoresinous varnishes, drying oil modified alkyds, drying oils, copolymerized with unsaturated hydrocarbons; (2) Thermal convertible vehicles: phenol-aldehyde condensation resins, urea-aldehyde condensation resins, melamine-aldehyde condensation resins, thermal convertible alkyl resins, silicone resins, hydrocarbon resins; (3) Vehicles which cast films from solutions of volatile solvents: cellulose esters and cellulose ethers, vinyl-copolymers, acrylic-copolymers, chlorinated rubber, butadiene-styrene copolymers.

Among the pigment and ink bases are the following: (1) Active pigments: white lead (white), basic lead sulphate (white), red lead, zinc oxide (white), zinc chromate, basic lead silicate (white) (2) Inactive pigments: A. Metal oxides and derivatives: titanium dioxide (white), zinc sulphide (white), antimony oxide, iron oxide, lead chromate, iron blue, copper phthalocyanine blue; B. Others: organic toners and dyes, carbon black, bone black; (3) Extenders: whitings, talc, barytes diat. silica, China clay mica.

Further examples of preparing onium-clay are the following:

*Example A.*—167 lbs. of Wyoming bentonite was dispersed in 500 gallons of water and the slurry centrifuged to remove non-clay impurities. To the centrifuged dispersion was added 100 gallons of an aqueous solution containing 29.5 lbs. of commercial octadecylamine and 5.7 lbs. of glacial acetic acid. The flocculent precipitate which formed was washed to remove soluble salts, filtered, dried at a temperature below 175° F. and pulverized.

*Example B.*—167 lbs. of Wyoming bentonite was dispersed in 500 gallons of water and centrifuged. The effluent was mixed with 100 gallons of a solution of 74.7 lbs. of 75% active dimethyldioctadecylammonium chloride. The flocculent precipitate was washed, filtered, dried and pulverized.

*Example C.*—335 lbs. of magnesium bentonite from Hector, California, was dispersed in 500 gallons of water and centrifuged. The effluent was mixed with 100 gallons of a solution of 74.7 lbs. of 75% active dimethyldioctadecylammonium chloride. The flocculent precipitate was washed, filtered, dried and pulverized.

The following examples illustrate embodiments of this invention:

EXAMPLE I 2750 g. of a Wyoming bentonite was dispersed in 70 liters of water and the slurry allowed to stand for two hours to settle out the non-clay impurities. About 10% of the weight of the bentonite was discarded in this process. 150 g. (2.5 mol) of glacial acetic acid was added to 663 g. (2.5 mol) of octadecadienylamine (an octadecylamine) and the amine salt then dissolved in 4 liters of warm water. Flocculation of the bentonite occurred upon addition of the amine salt solution, and the flocculent precipitate was filtered, washed, dried, and pulverized. One pound of this powder was ballmilled with 20 pounds of linseed oil to produce a viscous liquid exhibiting thixotropy, for use as a paint vehicle.

EXAMPLE II

A paint of the following composition was prepared:

Pigment, 71.6% } 100% white lead
Vehicle, 28.4% }
    34% A.A. linseed oil
    31% pale heat bodied linseed oil
    3% drier
    32% thinner Three test paints were then prepared as follows:
1. Blank, as formulated.
2. The octadecadienyl ammonium bentonite acetate as prepared in Example I was incorporated in the AA linseed oil so that the finished paint contained 10 pounds per gallon of paint.
3. Aluminum napthenate was added by solution in the volatile thinner so that the finished paint contained 8 pounds per 100 gallon of paint.

The results on paint thickening and suspension of the above test paints are given in the following table:

| Paint No. | 1 | 2 | 3 |
|---|---|---|---|
| Consistency, 1 day | 300 g. | 650 g. | 370 g. |
| Consistency, 8 days | 300 g. | 600 g. | 360 g. |
| Consistency, 60 days | 300 g. | 530 g. | 325 g. |
| Dry to touch | 4.25 hr. | 4.25 hr. | 4.5 hr. |
| Leveling | OK | OK | OK. |
| Gloss | OK | OK | OK. |
| Hardness in can, 21 days | OK | OK | OK. |
| Settling in can, 21 days | bad | none | bad. |

In the above table, the term "consistency" is a measure of the gram weight necessary to give 200 revolutions per minute in a Krebs Modified Stormer viscosimeter at 25° C.

EXAMPLE III

Triphenyl-lauryl phosphonium bromide was prepared by refluxing a mixture of equivalent weights of triphenylphosphine and lauryl bromide. After six hours the reaction mixture was cooled and dissolved in alcohol. To a dispersion of 50 g. of Wyoming bentonite in one liter of water was added an alcohol solution of 0.05 mol of the phosphonium base. Upon bringing the pH of the slightly basic dispersion to about 4 with dilute hydrochloric acid, the bentonite complex flocculated, was filtered, washed, dried, and ground. 2 g. of this powdered product, placed in 100 ml. of nitrobenzene in a graduate, swelled to a translucent yellow gel occupying a volume of 66 ml. Mild agitation was sufficient to disperse the gel to a stable translucent thixotropic solution. This bentonite compound was found to be suitable as a paint-thickening agent.

EXAMPLE IV

One-tenth mol of didodecyl ethyl sulfonium bromide is dispersed in one liter of water, and this is then mixed by agitation with 400 cc. of a 2½% suspension of Wyoming bentonite. After one hour's standing, it is filtered, dried, and ground. The resulting long-chain bentonite compound thus obtained may be incorporated into a paint vehicle, with a resulting paint-thickening.

EXAMPLE V

The process of Example IV is carried out except that one-tenth mol of decyl-triphenylarsonium halide is used instead of didodecyl ethyl sulfonium bromide.

EXAMPLE VI

The process of Example IV is carried out except that one-tenth mol of decyl-triphenylstibonium halide is used instead of didodecyl ethyl sulfonium bromide.

EXAMPLE VII

The process of Example IV is carried out except that one-tenth mol of didodecyl-gamma-pyrone is used instead of didodecyl ethyl sulfonium bromide.

EXAMPLE VIII

The process of Example IV is carried out except that one-tenth mol of didodecyl ethyltelluronium chloride is used instead of didodecyl ethyl sulfonium bromide.

EXAMPLE IX

*Paint with oleoresinous vehicle*

| | Parts |
|---|---|
| Titanium calcium pigment | 28.0 |
| Zinc oxide | 7.0 |
| 25% phenolic resin-tung oil varnish | 35.0 |
| Paint thinners and driers | 30.0 |
| | 100.0 |

Consistency: 200 grams
Consistency: 280 grams, following the addition of 5 lbs. per 100 gallons of the product of Example A.

EXAMPLE X

*Paint with soybean oil modified alkyd resin solution*

| | Parts |
|---|---|
| Iron oxide | 12.5 |
| Lead chromate | 14.5 |
| Lampblack | 4.0 |
| Soybean oil modified alkyd 60% oil fatty acids | 30.0 |
| Paint thinners and driers | 39.0 |
| | 100.0 |

Consistency: 145 grams
Consistency: 212 grams, following the addition of 3 lbs. per 100 gallons of the product of Example A.

EXAMPLE XI

*Urea baking coating black*

| | Parts |
|---|---|
| Coconut oil modified alkyd resin | 8.0 |
| Butylated urea formaldehyde resin | 8.0 |
| Carbon black | 2.5 |
| Diatomaceous silica | 15.0 |
| Paint thinners | 66.5 |
| | 100.0 |

Consistency: 67 grams
Consistency: 94 grams following the addition of 2½ lbs. per 100 gallons of the product of Example A.

EXAMPLE XII

*Nitrocellulose lacquer black*

| | Parts |
|---|---|
| Nitrocellulose, dry weight | 10.0 |
| Castor oil modifier alkyd resin | 12.0 |
| Dibutyl phthalate plasticizer | 2.7 |
| Lacquer solvents | 73.3 |
| Carbon black | 2.0 |
| | 100.0 |

Consistency: 85 grams
Consistency: 163 grams, following the addition of 6 lbs. per 100 gallons of the product of Example A.

EXAMPLE XIII

*Clear ethylcellulose coating*

| | Parts |
|---|---|
| Ethylcellulose | 12.0 |
| Raw castor oil | 1.0 |
| Lacquer solvents | 87.0 |
| | 100.0 |

Consistency: 65 grams
Consistency: thick gel following the addition of 15 lbs. per 100 gallons of the product of Example B.

EXAMPLE XIV

*Asphalt base vehicle coating*

|  | Parts |
|---|---|
| Asphalt base vehicle | 20.8 |
| Paint thinners | 30.2 |
| Calcium carbonate | 24.0 |
| Barytes | 25.0 |
|  | 100.0 |

Consistency: 165 grams
Consistency: thick thixotropic gel following the addition of 3 lbs. per 100 gallons of the product of Example B.

EXAMPLE XV

|  | Parts |
|---|---|
| Lithopane | 52.87 |
| Titanium dioxide | 8.52 |
| Raw linseed oil | 29.40 |
| Heat bodied linseed oil | 3.13 |
| Thinners and driers | 6.38 |
|  | 100.00 |

Consistency: 222 grams
Consistency: 480 grams following the addition of 8 lbs. per 100 gallons of the product of Example C.

The invention having thus been described, what is claimed is:

1. A paint, comprising a pigment base suspended in an organic paint vehicle, together with a suspending medium embodying a cation modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases, and which forms a gel in the vehicle and has a substantial gel characteristic therein.

2. A paint, comprising a pigment base suspended in an organic paint vehicle, together with a suspending medium embodying a cation modified clay, originally exhibiting a substantial base-exchange capacity, in which the clay cation has been replaced by a substituted onium ammonium cation and which forms a gel in the vehicle and has a substantial gel characteristic therein.

3. A process of preparing a paint, comprising treating an organic paint vehicle and a pigment base, with an onium cation-modified bentonite which forms a gel in the vehicle and has a substantial gel characteristic therein and combining the resulting vehicle and base.

4. A process of preparing a paint, comprising incorporating a cation modified clay, originally exhibiting a substantial base-exchange capacity, in which the clay cation has been replaced by a substantial cation of the class of onium bases consisting of ammonium, phosphonium, sulfonium, arsonium, stibonium, oxonium, and telluronium bases, with a pigment base in an organic paint vehicle.

5. An organic coating vehicle having colloidally dispersed therein to an amount sufficient to substantially increase the viscosity thereof, a cation-modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases, to an extent sufficient to form with the clay anion an organophilic clay and which forms a gel in the vehicle and has a substantial gel characteristic therein.

6. An organic coating vehicle having colloidally dispersed therein, to an amount sufficient to substantially increase the viscosity thereof, a cation-modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases, to an extent sufficient to form with the clay anion an organophilic clay and which forms a gel in the vehicle and has a substantial gel characteristic therein.

7. An organic coating vehicle having colloidally dispersed therein, to an amount sufficient to substantially increase the viscosity thereof, a cation-modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases, to an extent sufficient to form with the clay anion an organophilic clay and which forms a gel in the vehicle and has a substantial gel characteristic therein, to the extent that 2 grams swell to at least 25 milliliters in nitrobenzene.

7. An organic coating vehicle having colloidally dispersed therein, to an amount sufficient to substantially increase the viscosity thereof, a cation-modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases and with a hydrophobic radical having a linear dimension of at least 14 Angstrom units, to an extent sufficient to form with the clay anion an organophilic clay and which forms a gel in the vericle and has a substantial gel characteristic therein.

8. An organic coating vehicle having colloidally dispersed therein, to an amount sufficient to substantially increase the viscosity thereof, a cation-modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases and with a hydrophobic radical having a molecular area of at least 70 square Angstrom units, to an extent sufficient to form with the clay anion an organophilic clay and which forms a gel in the vehicle and has a substantial gel characteristic therein.

9. An organic coating vehicle having colloidally dispersed therein, to an amount sufficient to substantially increase the viscosity thereof, a cation-modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases and with a hydrophobic radical having at least 10 carbon atoms in a chain, to an extent sufficient to form with the clay anion an organophilic clay and which forms a gel in the vehicle and has a substantial gel characteristic therein.

10. An organic coating vehicle having colloidally dispersed therein, to an amount sufficient to substantially increase the viscosity thereof, a cation-modified montmorillonite in which the clay cation has been replaced by a substituted cation of the class of onium bases consisting of ammonium, phosphonium, sulfonium, arsonium, stibonium, oxonium and telluronium bases, to an extent sufficient to form with the clay anion an organophilic clay and which forms a gel in the vehicle and has a substantial gel characteristic therein.

11. A paint, comprising a pigment base suspended in an organic vehicle, having colloidally dispersed therein to an extent sufficient to substantially increase the viscosity thereof, a cation-modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases, to an extent sufficient to form with the clay anion an organophilic clay and which forms a gel in the vehicle and has a substantial gel characteristic therein.

12. An ink, comprising an ink base suspended in an organic vehicle, having colloidally dispersed therein to an extent sufficient to substantially increase the viscosity thereof, a cation-modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases, to an extent sufficient to form with the clay anion an organophilic clay and which forms a gel in the vehicle and has a substantial gel characteristic therein.

13. An organic coating vehicle having colloidally dispersed therein to an amount sufficient to substantially increase the viscosity thereof, an organophilic swelling ammonium bentonite having a hydrophobic radical with a molecular area of at least 70 square Angstrom units.

14. An organic coating vehicle having colloidally dispersed therein to an amount sufficient to substantially increase the viscosity thereof, an organophilic normal alkyl ammonium bentonite having an organic radical with at least 12 carbon atoms in a straight chain.

15. An organic coating vehicle having colloidally dispersed therein to an amount sufficient to substantially increase the viscosity thereof, an organophilic octadecyl ammonium bentonite.

16. An organic coating vehicle having colloidally dispersed therein to an amount sufficient to substantially increase the viscosity thereof, an organophilic dodecyl ammonium bentonite.

17. An organic coating vehicle having colloidally dispersed therein to an amount sufficient to substantially increase the viscosity thereof, an organophilic phosphonium bentonite having a hydrophobic radical with at least 10 carbon atoms in a straight chain.

18. An organic coating vehicle having colloidally dispersed therein to an amount sufficient to substantially increase the viscosity thereof, an organophilic sulfonium bentonite having a hydrophobic radical with at least 10 carbon atoms in a straight chain.

19. An organic coating vehicle having colloidally dispersed therein to an amount sufficient to substantially increase the viscosity thereof, an organophilic oxonium bentonite having a hydrophobic radical with at least 10 carbon atoms in a straight chain.

GEORGE L. RATCLIFFE.

No references cited.